Jan. 13, 1931.  G. A. MILLAR  1,788,926
GLASS WORKING MACHINE
Filed May 14, 1926  4 Sheets-Sheet 3
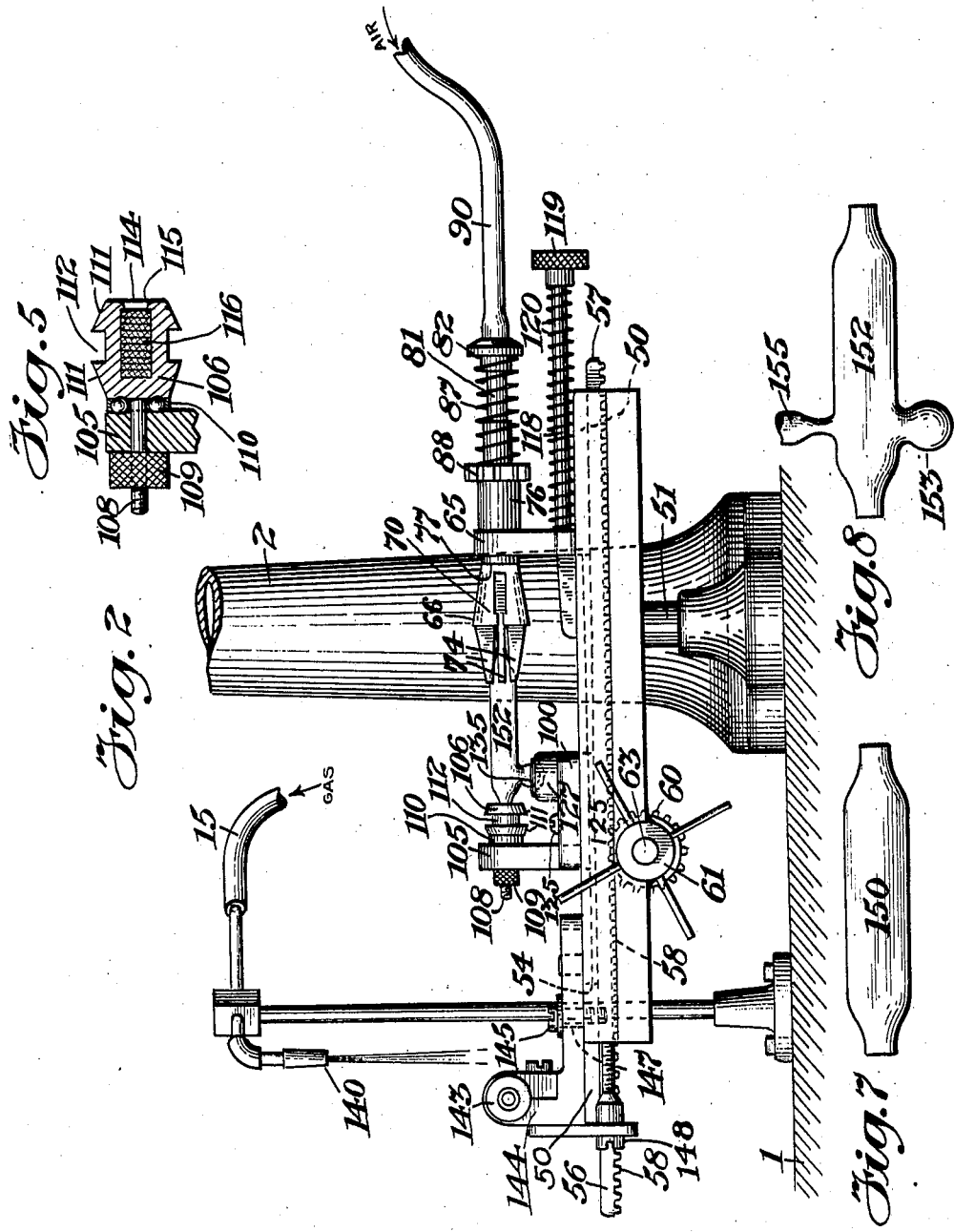
INVENTOR
George A. Millar
BY
Thos. H. Brown
ATTORNEY Jan. 13, 1931.  G. A. MILLAR  1,788,926
GLASS WORKING MACHINE
Filed May 14, 1926   4 Sheets-Sheet 4
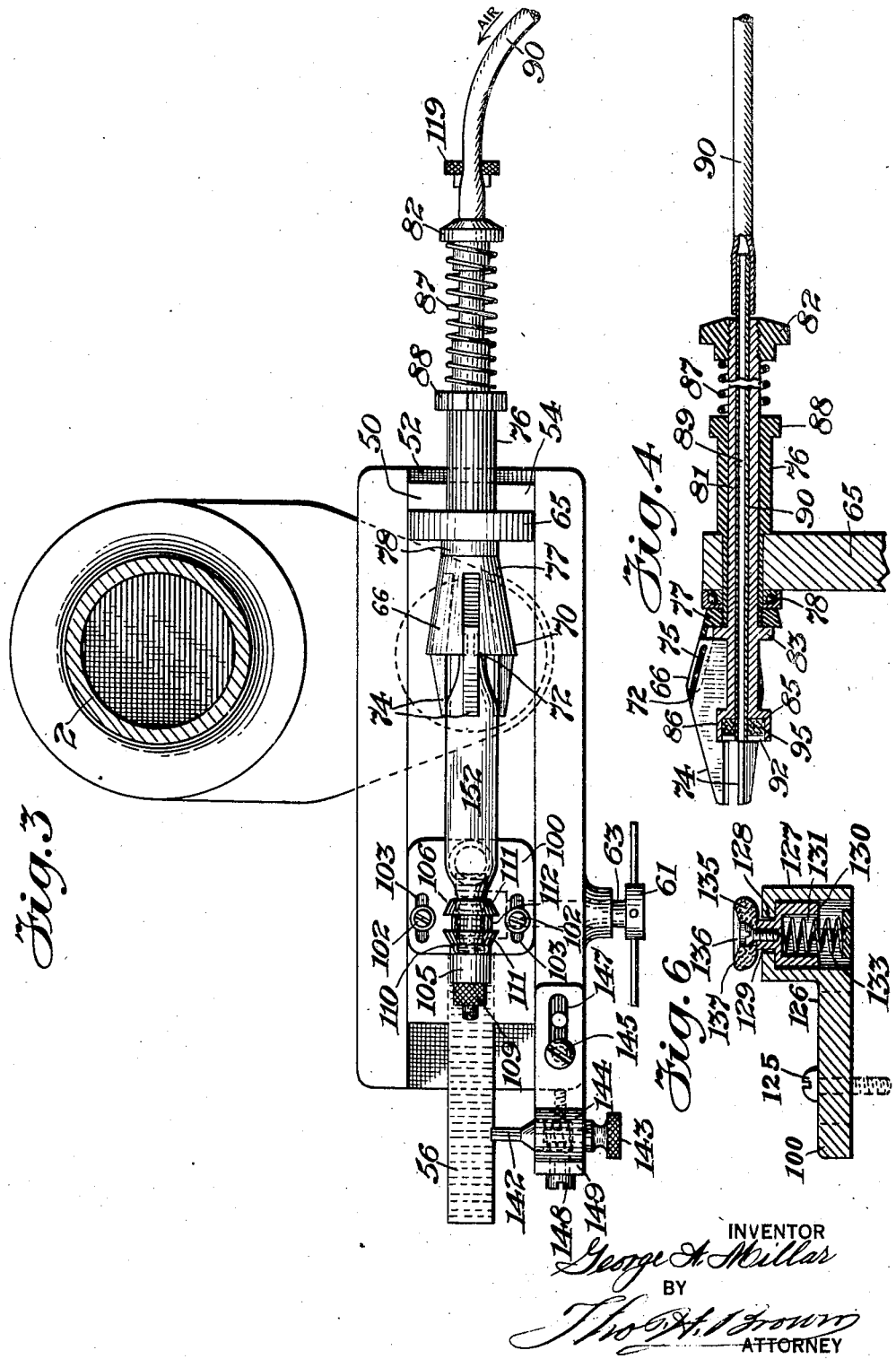
INVENTOR
George A. Millar
BY
Thos. A. Brown
ATTORNEY Patented Jan. 13, 1931

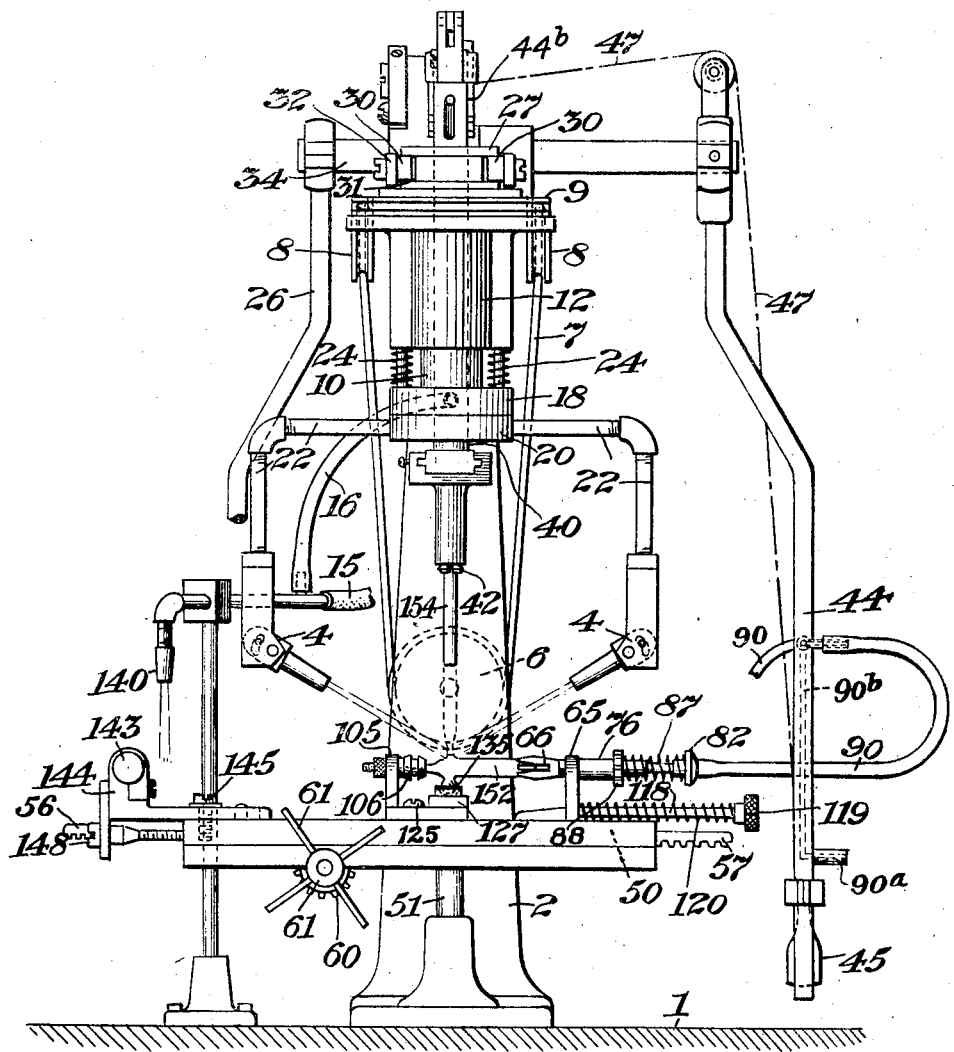

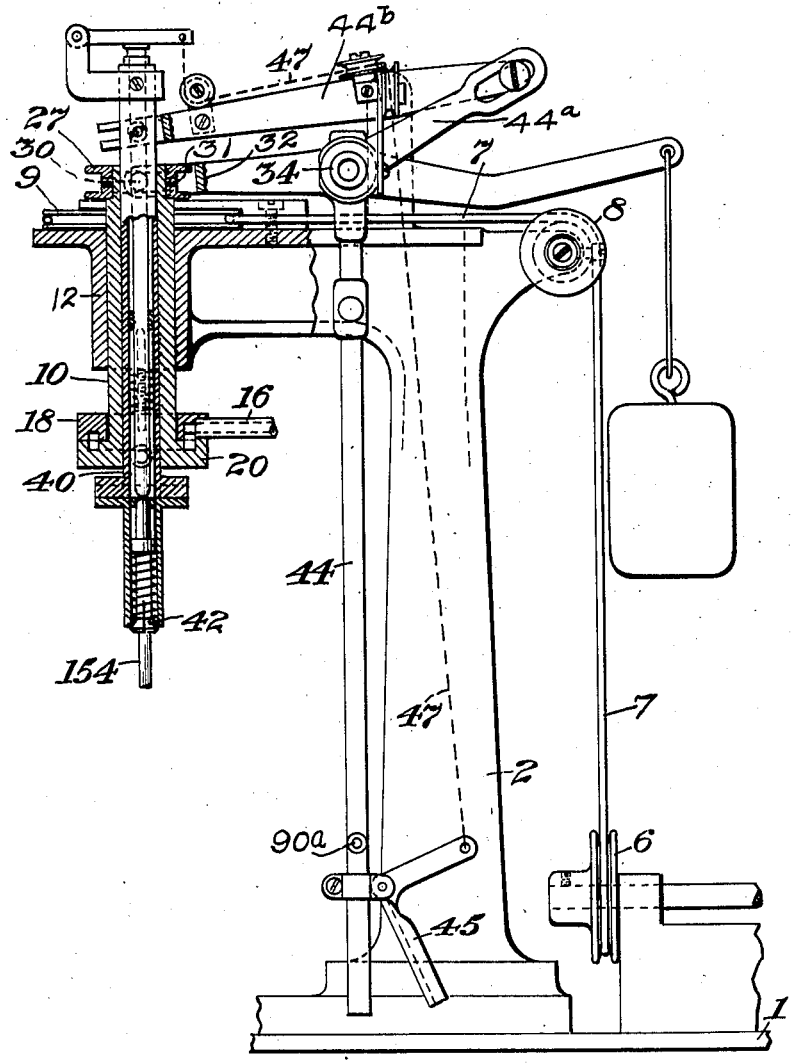

1,788,926

UNITED STATES PATENT OFFICE

GEORGE A. MILLAR, OF RIDGEFIELD PARK, NEW JERSEY, ASSIGNOR TO GENERAL ELECTRIC VAPOR LAMP COMPANY, OF HOBOKEN, NEW JERSEY, A CORPORATION OF NEW JERSEY

GLASS-WORKING MACHINE

Application filed May 14, 1926. Serial No. 109,027.

The present invention relates to method of and to apparatus and machine for working glass, particularly for forming blanks, hollow glass pieces into desired shapes.

The invention consists in new and novel methods of operation of a glass working machine adapted particularly for forming shapes from hollow glass blanks and new and original arrangements and combinations of steps in the process hereinafter described and more particularly set forth in the claims. The invention further consists in a new and novel glass working machine and of parts and combinations of parts thereof.

In the accompanying drawings I have shown for purposes of illustration one form of glass working machine embodying the invention and also a glass blank and a shape formed from the blank, in which Fig. 1 is a front elevation view of said machine, Fig. 1a is a side elevation view in part section of the machine of Fig. 1, Fig. 2 is an enlarged part view in front elevation showing details of work holding and moving parts of the machine of Fig. 1, Fig. 3 is a plan view of the parts shown in Fig. 2, Fig. 4 is a longitudinal sectional view of a glass part clamping, closure and pressure supplying means, Fig. 5 is a longitudinal sectional view of another supporting means, Fig. 6 is an elevation view of a glass blank positioning member, Fig. 7 is a longitudinal view of a blank shape of glass tubing, and Fig. 8 is a similar view of the blank after having a bulb and a tabulation formed thereon.

In the drawings the base 1 supports the standard 2 which carries the rotating gas burners 4, 4 which are actuable by means of a driving pulley 6, belt 7, pulleys, 8, 8 and 9, and the supporting cylinder 10 which is rotatable and also longitudinally movable in the bearing and supporting block 12. Gas connection is made to fires 4, 4 from a suitable source not shown through pipes 15 and 16, stationary block 18, a passageway between stationary block and the cooperating rotative block 20, through passageways in block 20, and pipes 22, 22. The springs 24, 24 serve to hold block 18 against block 20 as shown in detail in Fig. 1a. A more detailed description of this structure is made in copending application Serial Number 736,353, filed September 6, 1924 which was granted July 6, 1926, Patent Number 1,591,175. The fires 4, 4 are movable vertically by means of lever 26 which connects with the cylinder 10 through the grooved flange member 27 mounted to the top of said cylinder and which is engaged by the rollers 30, 30 which ride in the groove 31 thereof and which are carried by the fork member 32 mounted through an arm to said handle lever 26 by the spindle 34. As described in the copending application to which reference was made above said pulley 9 is splined to cylinder 10 which it drives by means of a long keyway permitting the vertical movement of cylinder 10 with respect to said pulley 9. Means not shown are provided for starting and stopping the movement of said driving pulley 6. Extending axially through said cylinder 10 is the chuck cylinder 40 which carries the chuck 42. The handle arm 44, which is pivotally mounted on the standard 2, has an arm 44a connected thereto, in the end of which is a slot which engages a pin on the rear end of a lever 44b. Said lever 44b is pivotally mounted at an intermediate point on an upward extension of the standard 2, while the forward end thereof is forked to pass on either side of the cylinder 40, each of said forked arms being slotted to engage pins which extend laterally from said cylinder 40. The vertical disposition of the cylinder 40, and of the chuck 42, is thus controlled by the handle arm 44. A handle grip 45 pivoted to lever 44, through chain or cord 47 serves to open said chuck 42 against the compression of a spring within cylinder 40 which tends to keep said chuck closed.

On base 1 below fires 4, 4 and chuck 42 is mounted the bed plate 50 which is supported by the post 51. Said plate 50 has formed longitudinally thereof the slideway channel 52 in which moves the plate 54 which carries along its bottom and on the bottoms of the longitudinal extensions 56 and 57 thereof, the gear rack 58. The pinion 60 serves for actuating said rack 58 when rotated through operation of the handle member 61, said pinion 60 and said handle member 61 both being carried by the shaft 63 which is mounted for rotation on said bed plate 50.

At one end of plate 50 is mounted the post 65 which carries the chuck 66 which comprises the hollow frusto-cone 70 in the lateral slots 72, 72 of which move the jaws 74, 74. Said jaws 74, 74 in turn have formed in the sides thereof the slots 75, 75 into which fit the lateral edges of said slots 72, 72. Said cone 70 is carried by the hollow stem 76 which extends through post 65 and is threaded into the flat end 77 of said cone. The bearing member 78 is mounted about sleeve 76 between the end member 77 on said cone 70 and post 65. A second sleeve 81 which extends through said sleeve 76 carries at the outer end a knob handle 82 and near its inner end the annular flange 83. At its inner end said sleeve 81 carries the hollow cylindrical head 85 which fits into slots 86 formed in the inner edge of each of said jaws 74, 74. A spring 87 mounted about said sleeve 81 between the knob 82 and a handle knob 88 formed on said sleeve 76 tends to cause said jaws 74, 74 to close by moving said head 85 against the inner sides of said slots 86, 86. When the sleeve 81 is pressed inwardly as by means of handle knob 82 the said head 85 bears against the opposite side of said slot 86 and moves said jaws 74, 74 to open them. The annular flange 83 formed on said sleeve 81 serves as a stop at the limiting position of closing of said jaws 74, 74 and also acts with said head 85 to move them to open them by bearing against their bases.

Extending through a central opening through sleeve 81 is the tube 89 which at the outer end extends beyond said knob 82 and serves for the attachment of the air hose 90 and at its inner end terminates within the annular opening 92 formed in the face of said head 85. The annular cushion member 95 mounted in opening 92 about said inner end of tube 89 serves as a cushioning and closure member for the end of glass tubing when held by said chuck 66.

The air hose 90 at its other end is fastened to the lever 44 and is provided with a by-pass pipe 90b terminating near the handle of the lever 44 and the operator by placing the finger over the hole in the pipe at 90a shuts off the escape of air at this point and the air is forced then through the pipe 90 into the tube being blown. Closing the pipe secures maximum increase of air pressure in the tube 152 and partially closing it by the finger gives a lessened pressure and the operator is thus able to control the increases and reductions of air pressure in the tube 152 as desired in the operation of the apparatus.

On said slide 54 and near the end opposite said post 65 is the slide plate 100 which is slidably held by the bolts 102 which extend through slots 103, 103 formed in slide 100 and into slide 54. On said slide 54 is the post 105 which is aligned opposite said post 65 and which carries the socket 106 mounted thereto by the pin 108 and nut 109. A bearing member 110 between post 105 and socket 106 serves to permit free rotation of the socket when pressed against said post. Said socket has formed thereabout a guide comprising the shoulders 111, 111 and the annular channel 112 formed therebetween (see Fig. 5). A central bore 114 formed coaxially in said socket has formed around its lateral surface near the outer end thereof the annular shoulder 115 which serves as a centering means for glassware and also for holding in said bore the cushioning and closure member 116 which is of asbestos fiber, felt, rubber or the like. Extending from slide 100 over the slide 54 and through an opening in said post 65 is the bar 118 which terminates in a handle knob 119 and carries between said knob 119 and post 65 the compression spring 120 which tends to draw said slide 100 in the direction of said post 65.

Mounted and slidably adjustable on said slide plate 100 by means of the screw 125 is the plate 126 (see Fig. 6) which carries the upwardly extending hollow boss 127 which has the inwardly extending annular flange 128 formed near the top of the opening 129 therein. Within said hollow boss 127 and fitting the sides thereof with a sliding fit is the carrier member 130 which has an opening 131 formed in its under-side to receive the compression spring 133 which tends to hold member 130 against said flange 128. At its top said member 130 carries the positioning member 135 which has a depression 136 formed therein preferably in a line which is a downward projection of the axis of said chuck 66 and socket 106. Said depression 136 is bounded by the ridge 137 which slopes downwardly both ways from the top or apex thereof.

Near the end and over the middle of plate 50 away from chuck 66 is the gas fire 140 which extends downwardly. Also at this end is the slidable stop pin 142 which has a handle knob 143 at one end and by its other end is adapted to engage groove 112 on socket 106 to position a piece of hollow glass held in said socket 106 with a predetermined point thereof directly below said fire 140. Said pin 142 is carried by the holder member 144 which is longitudinally adjustably mounted on plate 50 by means of screw 145 which extends through slot 147 in member 144 and into plate 50. Adjustment of member 144 and pin 142 with respect to fire 140 is secured by means of the screw 148. Said pin 142 is movably held in position by means of the spring 149 which presses against it and against a shoulder formed in the opening through which it extends in said member 144.

In Fig. 7 is illustrated a blank 150 of glass tubing which is adapted to be handled and worked by the machine above described for making the partially completed mercury switch body 152 illustrated by Fig. 8 and which has had formed thereon the hollow bulb 153 and the tubulation 155, both of which connect with the interior of said body 152.

In the use and operation of the machine above described for making the switch body 152, shown in Fig. 8, from the tube blank 150 shown in Fig. 7, the said blank is positioned between chuck 66 and socket 106 by spreading the chuck jaws 74, 74 apart by means of knob 82 and pushing the socket 106 away against the compression of spring 120, one end of the blank being positioned against the closure and cushioning member 116 and the opposite end placed between jaws 74, 74 which are allowed to close thereon by releasing said knob 82. By adjusting the blank 150 by means of handle member 61 and rack 58 a desired spot on the blank is brought to a position directly beneath the center of the machine between said fires 4, 4 which are caused to rotate and by means of lever 26 are caused to impinge on said spot to soften the glass thereat. As the glass at this spot softens under this application of heat, pressure is applied to the interior of the blank by closing or regulating the opening 90ª (called a finger valve) in the bypass 90ᵇ in the end of the pressure control pipe whereby the softened portion is pushed outwardly and a bulb 153 with a constricted connection to the blank body formed therefrom by successively cooling and heating various parts of the blown out portion to cause them to constrict or extend outwardly in a manner well known in the art. The thickness of the wall of the bulb 153 formed is increased as desired by melting additional glass thereon during this operation. Said positioning member 135 having been adjusted to a position below that at which said bulb 153 is formed and the bulb having been allowed to cool sufficiently, said body 152 is rotated by means of the handle knob 88 to position the bulb in said member 135. In this positioning operation the bulb will ride over said ridge 137, pressing it down until the bulb is in said depression 136 whereupon the said spring 133 will hold the member 135 against and about the sides of said bulb. Said plate 50 is then moved by means of handle member 61 to bring the channel 112 of said socket 106 opposite said pin 142 which slides over the first of said ridges 111 in which position it is caused to slide into said channel 112 by means of said spring 149. This position is predetermined by adjusting said screw 148 so that a desired point of said blank body 152 is beneath the said fire 140, which is then caused to impinge thereon to soften the glass thereat which is blown out by increasing the pressure to a sufficient point in said body by closure or adjustment of the opening in finger valve 90ª. The pin 142 is then released from channel 112 by means of the handle 143 and the opening thus formed is brought directly beneath said chuck 42, said fires 4, 4 are caused to rotate and brought downwardly toward the puncture and the handle lever 44 is moved to cause said chuck 42 to carry a glass tube 154 held therein near said puncture and into the fire where it and the glass at the puncture are heated, after which the tube is tubulated to the blank in a manner well known in the art.

Although I have shown and described and have pointed out in the annexed claims certain novel features of the invention, it will be understood that various omissions, substitutions and changes in the several steps of the process and in its operation and in the form and details of the apparatus illustrated may be made by those skilled in the art without departing from the spirit of the invention.

I claim:

1. In a machine for shaping glass tubing, in combination, means for supporting and closing a glass tube at one end thereof, means for supporting and closing the tube at its other end and for making connection adapted for applying air pressure to the interior of the tube, means tending to move first said means toward second said means, and a positioning member in operative relation to the tube adapted to receive a projection therefrom.

2. In a machine for shaping glass tubing, in combination, means for supporting and closing a glass tube at one end thereof, means for supporting and closing the tube at its other end and for making connection adapted for applying air pressure to the interior of the tube, means tending to move first said means toward second said means, a positioning member in operative relation to the tube adapted to receive a projection therefrom, said positioning member comprising a member having a depression formed therein, and resilient means tending to move said member towards said tube.

3. In a machine for shaping glass tubing, in combination, means for supporting and closing a glass tube at one end thereof, means for supporting and closing the tube at its other end and for making connection adapted for applying air pressure to the interior of the tube, means tending to move first said means toward second said means, and a positioning member adapted to receive a projection from said tube and adjustably movable axially with respect to said tube.

4. In a machine for shaping glass tubing, in combination, means for supporting and closing a glass tube at one end thereof, means for supporting and closing the tube at its other end and for making connection adapted for applying air pressure to the interior of the tube, means tending to move first said means toward second said means, and means for heating the tube held by said supporting means, said supporting means being movable together with respect to said heating means.

5. In a machine for shaping glass tubing, in combination, a support member, means for holding and supporting a glass tube at one end thereof, means for holding and supporting the glass tube at the other end, means for applying air pressure to the interior of the tube, means for heating the tube, both said holding means being movable together on said support member and relatively to said heating means.

6. In a machine for shaping glass tubing, in combination, means for supporting and closing a glass tube at one end thereof, means for supporting and closing the tube at its other end and for making connection adapted for applying air pressure to the interior of the tube, last said means being rotatable to move a tube held thereby about its axis, means for heating the tube and a positioning member in operative relation to the tube adapted to receive a projection therefrom.

7. In a machine for shaping glass tubing, in combination, means for supporting and closing a glass tube at one end thereof, means for supporting and closing the tube at its other end and for making connection adapted for applying air pressure to the interior of the tube, last said means being rotatable to move a tube held thereby about its axis, means for heating the tube, a positioning member adapted to receive a projection from said tube and means for applying pressure to the interior of the tube and for controlling the pressure.

8. In a machine for shaping glass tubing, in combination, means for supporting and closing a glass tube at one end thereof, means for supporting and closing the tube at its other end and for making connection adapted for applying air pressure to the interior of the tube, last said means being rotatable to move a tube held thereby about its axis, means for heating the tube, a positioning member adapted to receive a projection from said tube, means for applying pressure to the interior of the tube and for controlling the pressure, and means for moving said positioning member axially with respect to said tube holding means.

9. In a machine for shaping glass tubing, in combination, means for supporting and closing a glass tube at one end thereof, means for supporting and closing said glass tube at its other end and for making connection adapted for applying air pressure to the interior of the tube, last said means being rotatable to move a tube held thereby about its axis, means for heating the tube, a positioning member adapted to receive a projection from said tube, means for applying pressure to the interior of the tube and for controlling the pressure and means for moving both said holding means axially.

10. In a machine for shaping glass tubing, in combination, means for supporting and closing a glass tube at one end thereof, means for supporting and closing the tube at its other end and for making connection adapted for applying air pressure to the interior of the tube, last said means being rotatable to move a tube held thereby about its axis, means for heating the tube, a positioning member adapted to receive a projection from said tube, means for applying pressure to the interior of the tube and for controlling the pressure, means for moving said positioning member axially with respect to said tube holding means and means for moving both said holding means and also said positioning means together axially.

11. In a machine for shaping glass tubing, in combination, means for supporting and closing a glass tube at one end thereof, means for supporting and closing the tube at its other end and for making connection adapted for applying air pressure to the interior of the tube, last said means being rotatable to move a tube held thereby about its axis, means for heating the tube, means for holding another tube at an angle to first said tube and for moving it to and from first said tube, and means for applying pressure to the interior of the first mentioned tube and for controlling the pressure.

12. In a machine for shaping glass tubing, in combination, means for supporting and closing a glass tube at one end thereof, means for supporting and closing the tube at its other end and for making connection adapted for applying air pressure to the interior of the tube, last said means being rotatable to move a tube held thereby about its axis, and means for heating the tube, means for receiving a projection extending from said tube, means for holding another tube at an angle to first said tube and for moving it to and from first said tube, and means for applying pressure to the interior of the first mentioned tube and for controlling the pressure.

13. In a machine for shaping glass tubing, in combination, means for supporting and closing a glass tube at one end thereof, means for supporting and closing the tube at its other end and for making connection adapted for applying air pressure to the interior of the tube, last said means being rotatable to move a tube held thereby about its axis, means for heating the tube, a positioning means for receiving a projection extending from said tube, means for applying pressure to the interior of the tube and for controlling the pressure, means for moving said positioning means axially with respect to said tube holding means, means for moving both said holding means and also said positioning means together axially, and means for holding another tube at an angle to first said tube and for moving it to and from first said tube.

14. In a machine for shaping glass tubing, in combination, a support member, means for holding and closing a glass tube at one end thereof, means for holding and closing the tube at its other end and for making connection adapted for applying air pressure to the interior of the tube, said means being movable one toward the other, means tending to move said holding means relatively toward each other, both said holding means being rotatable to move the tube held thereby about its axis and both of said holding means being movable together axially of a tube held thereby, means for moving said holding means, means for heating the tube, means for holding another tube at an angle to first said tube and for moving it to and from first said tube, and means for applying pressure to the interior of the first mentioned tube and for controlling the pressure.

15. In a machine for shaping glass tubing, in combination, means for supporting and closing a glass tube at one end thereof, means for supporting and closing the tube at its other end and for making connection adapted for applying pressure to the interior of the tube, last said means being rotatable to move a tube held thereby about its axis, means for heating the tube, a positioning member adapted to receive a projection from said tube, means for applying pressure to the interior of the tube and for controlling the pressure, means for moving both said holding means axially and releasable engaging means for retaining them at predetermined positions along the axial line.

16. In a machine for shaping glass tubing, in combination, means for supporting and closing a glass tube at one end thereof, means for supporting and closing the tube at its other end and for making connection adapted for applying pressure to the interior of the tube, last said means being rotatable to move a tube held thereby about its axis, means for heating the tube, a positioning member adapted to receive a projection from said tube, means for applying pressure to the interior of the tube and for controlling the pressure, means for moving both said holding means axially and adjustable releasable engaging means for retaining them at predetermined positions along the axial line.

17. In a machine for shaping glass tubing, in combination, a support member, means for holding and closing a glass tube at one end thereof, means for holding and closing the tube at its other end and for making connection adapted for applying pressure to the interior of the tube, said means being movable one toward the other, means tending to move said holding means relatively toward each other, both said holding means being rotatable to move the tube held thereby about its axis and both of said holding means being movable together axially of a tube held thereby, means for moving said holding means, means for heating the tube, means for holding another tube at an angle to first said tube and for moving it to and from first said tube, means for applying pressure to the interior of the first mentioned tube and for controlling the pressure and releasable engaging means for retaining the holding means for said first mentioned tube at predetermined positions along the axial line.

18. In a machine for shaping glass tubing, in combination, a support member, means for holding and closing a glass tube at one end thereof, means for holding and closing the tube at its other end and for making connection adapted for applying pressure to the interior of the tube, said means being movable one toward the other, means tending to move said holding means relatively toward each other, both said holding means being rotatable to move the tube held thereby about its axis and both of said holding means being movable together axially of a tube held thereby, means for moving said holding means, means for heating the tube, means for holding another tube at an angle to first said tube and for moving it to and from first said tube, means for applying pressure to the interior of the first mentioned tube and for controlling the pressure, and adjustable releasable engaging means for retaining the holding means for said first mentioned tube at predetermined positions along the axial line.

19. In a machine for shaping glass tubing, in combination, means for supporting and closing a piece of hollow glassware and for making connection adapted for applying air pressure to the interior of the glass part, said means being rotatable to move a hollow glass piece held thereby about an axis, means for heating the tube and a positioning member in operative relation to the tube adapted to receive a transverse projection therefrom at a definite rotative position of said tube.

20. In a machine for shaping glass tubing, in combination, means for supporting and closing a glass tube at one end thereof, and for making connection adapted for applying air pressure to the interior of the tube, said means being rotatable to move a tube held thereby about its axis, means for heating the tube, a positioning member adapted to receive a transverse projection from said tube at a definite rotative position of said tube, and means for applying pressure to the interior of the tube and for controlling the pressure.

21. In a machine for shaping glass tubing, in combination, means for supporting and closing a glass tube, and for making connection adapted for applying air pressure to the interior of the tube, and a positioning member in operative relation to the tube adapted to receive a transverse projection therefrom at a definite rotative position of said tube.

22. In a machine for shaping glass tubing, in combination, means for supporting and closing a glass tube and for making connection adapted for applying air pressure to the interior of the tube, a positioning member in operative relation to the tube adapted to receive a transverse projection therefrom at a definite rotative position of said tube, said positioning member comprising a member having a depression formed therein, and resilient means tending to move said member towards said tube.

23. In a machine for shaping glass tubing, in combination, means for supporting and closing a glass tube and for making connection adapted for applying air pressure to the interior of the tube, and a positioning member adapted to receive a transverse projection from said tube at a definite rotative position of said tube, said member being adjustably movable axially with respect to said tube.

Signed at Hoboken in the county of Hudson and State of New Jersey this 12th day of May A. D. 1926.

GEORGE A. MILLAR.